United States Patent
James

(10) Patent No.: US 9,791,612 B1
(45) Date of Patent: Oct. 17, 2017

(54) LIGHTING APPARATUS

(71) Applicant: Dylan Isaac James, Smyrna, GA (US)

(72) Inventor: Dylan Isaac James, Smyrna, GA (US)

(73) Assignee: Cooper Technologies Company, Houston, TX (US)

( * ) Notice: Subject to any disclaimer, the term of this patent is extended or adjusted under 35 U.S.C. 154(b) by 287 days.

(21) Appl. No.: 14/678,521

(22) Filed: Apr. 3, 2015

Related U.S. Application Data

(60) Provisional application No. 61/975,176, filed on Apr. 4, 2014.

(51) Int. Cl.
*F21V 8/00* (2006.01)

(52) U.S. Cl.
CPC ......... *G02B 6/0045* (2013.01); *G02B 6/0036* (2013.01); *G02B 6/0068* (2013.01)

(58) Field of Classification Search
CPC ... G02B 6/0045; G02B 6/0036; G02B 6/0038
See application file for complete search history.

(56) References Cited

U.S. PATENT DOCUMENTS

| | | | |
|---|---|---|---|
| 5,822,029 A * | 10/1998 | Davis | G02B 5/3016 349/115 |
| 8,911,132 B1 | 12/2014 | Foy et al. | |
| 2014/0268874 A1 * | 9/2014 | Clements | F21S 8/04 362/612 |

* cited by examiner

*Primary Examiner* — David V Bruce
(74) *Attorney, Agent, or Firm* — King & Spalding LLP

(57) ABSTRACT

A lighting system can comprise an edgelit panel, for example a lightguide that may have a panel or slab shape with an edge that is illuminated by an array of light emitting diodes extending along the edge. The edgelit panel may have light directing features associated with the edge. The light directing features can redirect light that is coupled through the edge. The redirected light can emit from a major face of the lightguide to produce a correspondingly redirected pattern of illumination. The resulting illumination of the lighting system can be biased in a particular direction as may be useful for various lighting applications. For example, in a streetlight application, the lighting system can produce illumination that is biased in a street side direction relative to a house side direction.

18 Claims, 8 Drawing Sheets

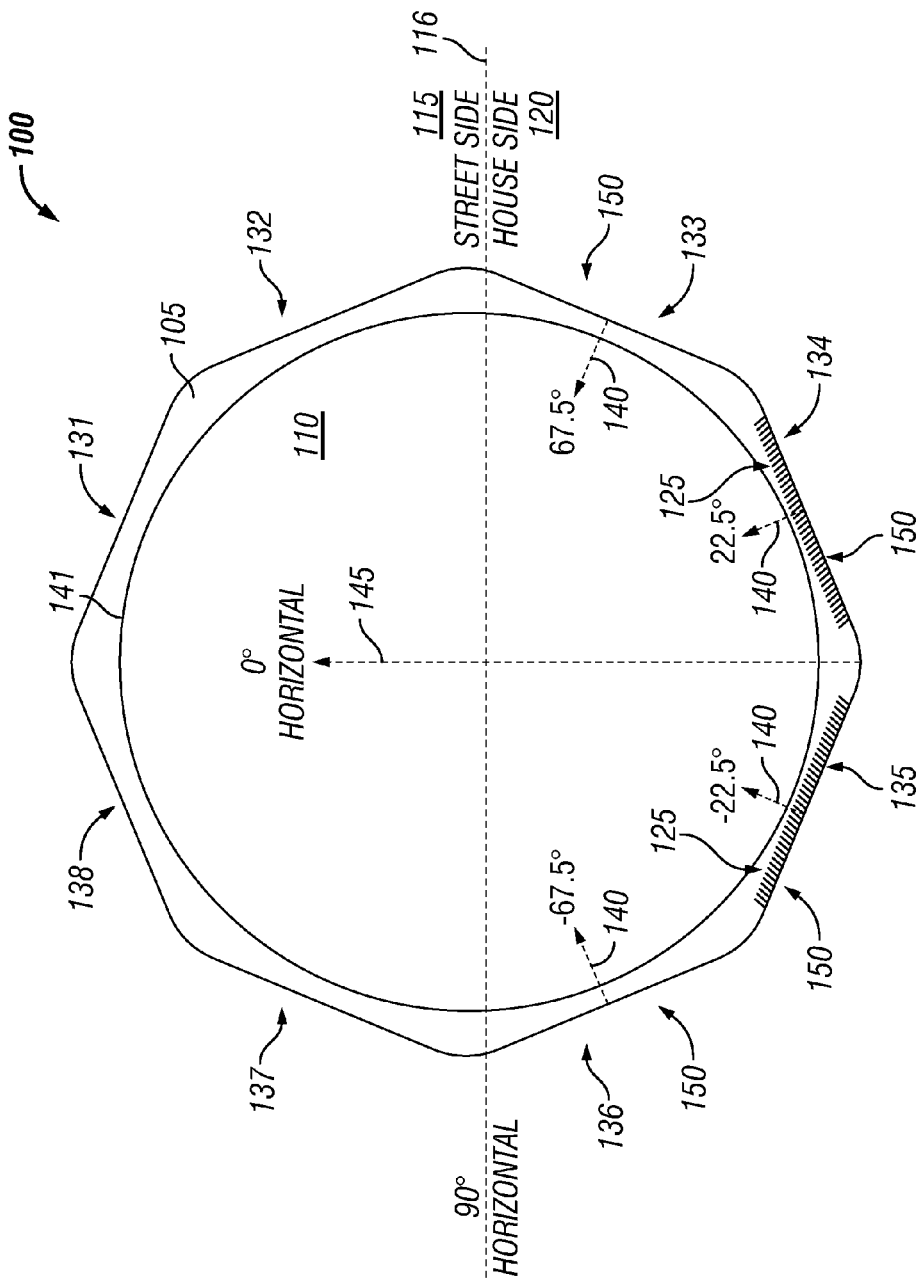

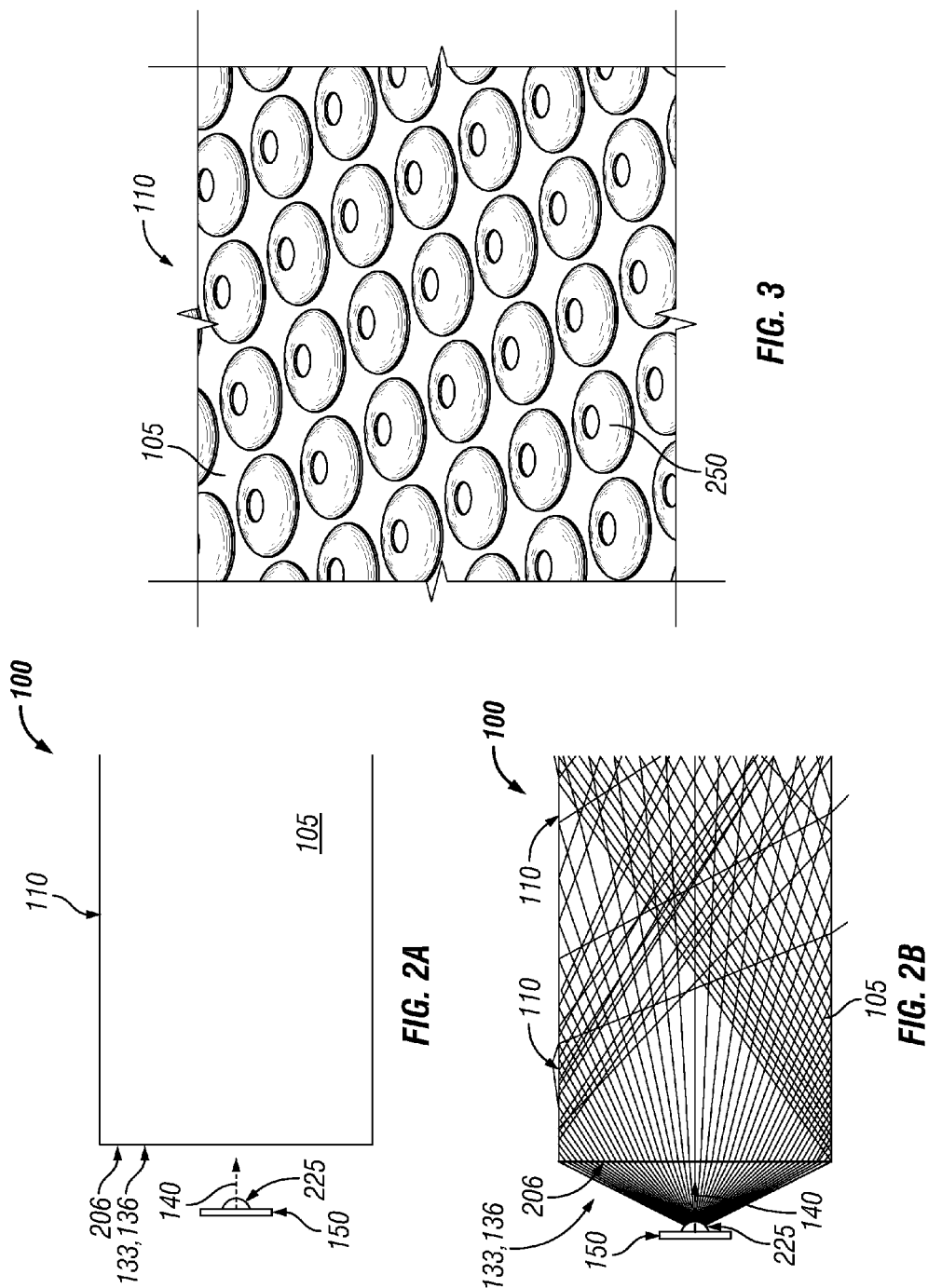

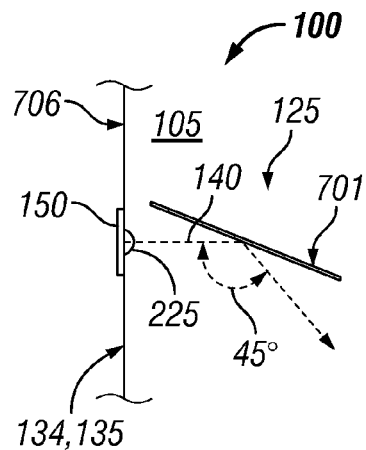
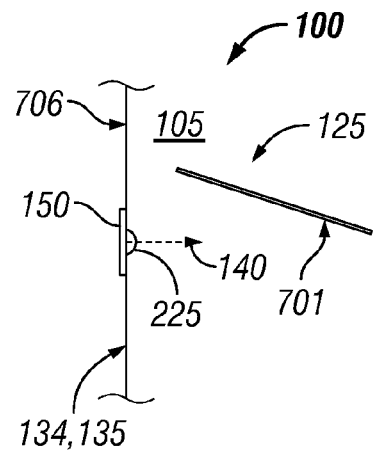
FIG. 7     FIG. 8
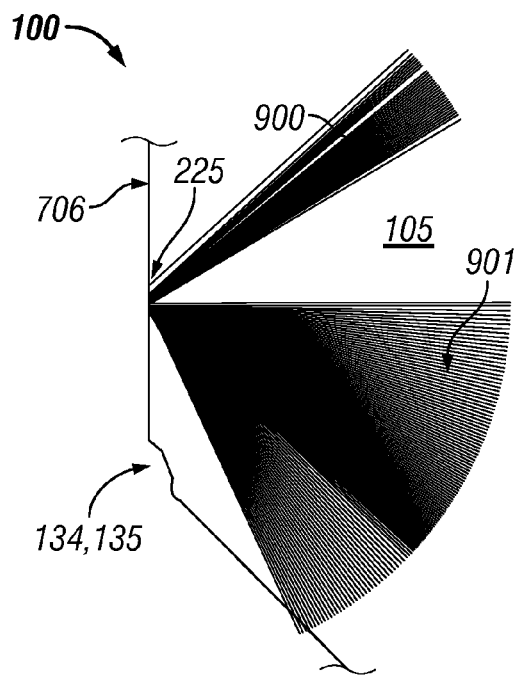
FIG. 9

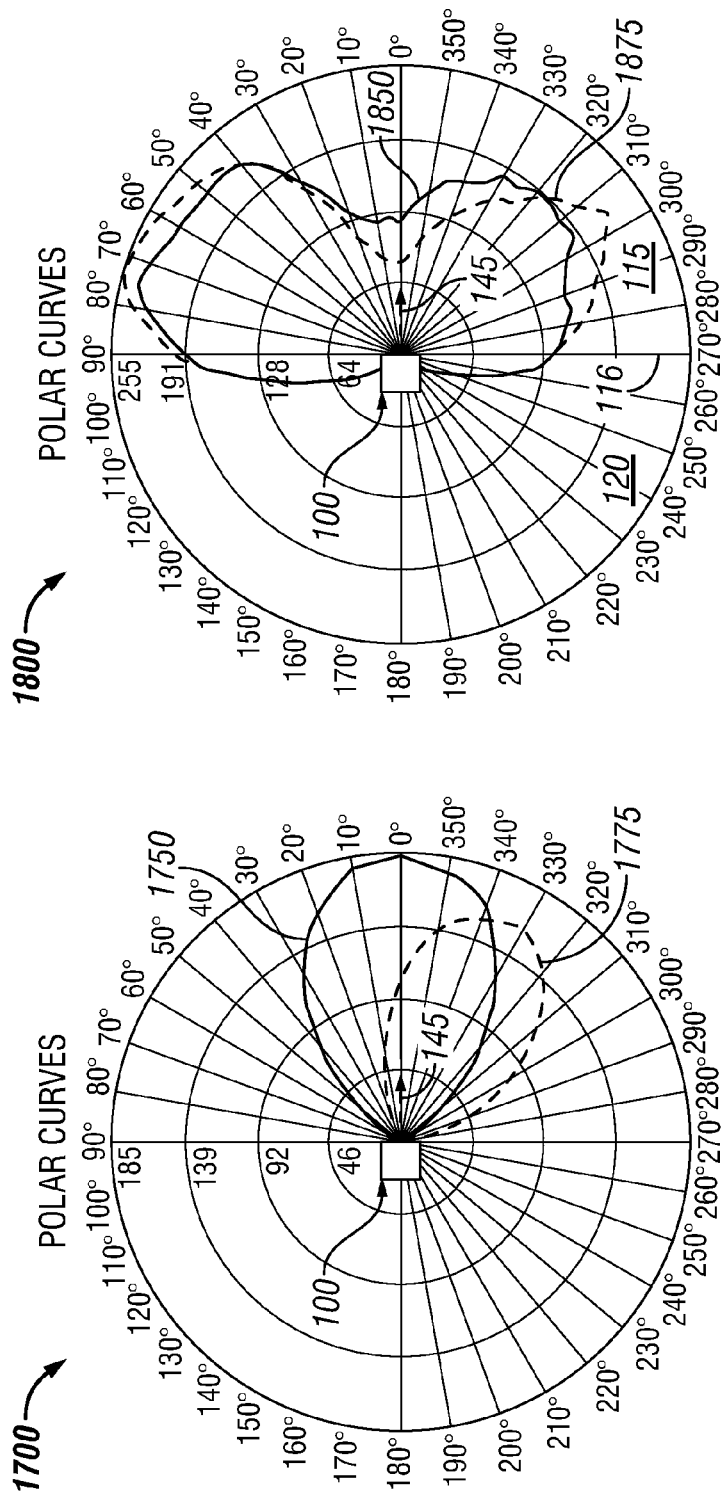

LIGHTING APPARATUS

CROSS REFERENCE TO RELATED APPLICATIONS

This application claims priority to U.S. Provisional Patent Application No. 61/975,176 filed Apr. 4, 2014 in the name of Dylan Isaac James and entitled "Lighting Apparatus," the entire contents of which are hereby incorporated herein by reference.

TECHNICAL FIELD

Embodiments of the technology relate generally to a lighting apparatus that includes a lightguide, and more particularly a panel-shaped lightguide that incorporates features for controlling the geometry of light flow within the lightguide and thus the pattern of illumination produced by the lightguide.

SUMMARY

A light source can be positioned adjacent an edge of a lightguide, so that the light source emits light into the lightguide via the edge. The lightguide can comprise a reflector that is positioned in an optical path of the light source and is oriented to redirect the coupled light. The reflector can be formed in the lightguide so that the lightguide receives light that is flowing in one direction and changes the direction of flow.

The foregoing discussion is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

BRIEF DESCRIPTION OF THE DRAWINGS

FIG. 1 illustrates an overhead view of a lighting system in a representative streetlight application according to some example embodiments of the present disclosure.

FIGS. 2A and 2B (collectively FIG. 2) illustrate cross sectional views of a section of the lighting system where a light emitting diode (LED) couples light into an edge of a lightguide, with the latter view overlaid with representative light rays, according to some example embodiments of the present disclosure.

FIG. 3 illustrates a surface of the lightguide of the lighting system, where the surface has been patterned with microlenses to promote release of a portion of internally incident light according to some example embodiments of the present disclosure.

FIG. 7 illustrates a single light emitting diode coupling light into an edge of the lightguide of the lighting system that has an associated light directing feature, wherein the feature redirects the optical axis of the light emitting diode according to some example embodiments of the present disclosure.

FIG. 8 illustrates a view of a single light emitting diode oriented to couple light into an edge of the lightguide of the lighting system that has an associated light directing feature according to some example embodiments of the present disclosure.

FIG. 9 illustrates a view of a representative pattern of light rays launched into an edge of the lightguide of the lighting system by a single light emitting diode oriented as illustrated in FIG. 8, wherein the edge has an associated light directing feature according to some example embodiments of the present disclosure.

FIG. 17 illustrates computer-generated polar plots of intensity distributions for the lighting system according to some example embodiments of the present disclosure.

FIG. 18 illustrates computer-generated polar plots of intensity distributions for the lighting system according to some example embodiments of the present disclosure.

Figure 4:
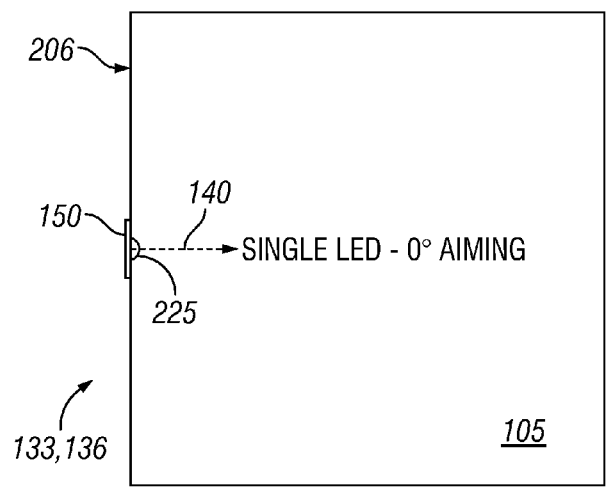
FIG. 4 illustrates a single light emitting diode coupling light into an edge of the lightguide of the lighting system, wherein the coupled light is allowed to flow without redirection according to some example embodiments of the present disclosure.

The drawings illustrate only example embodiments and are therefore not to be considered limiting of the embodiments described, as other equally effective embodiments are within the scope and spirit of this disclosure. The elements and features shown in the drawings are not necessarily drawn to scale, emphasis instead being placed upon clearly illustrating principles of the embodiments. Additionally, certain dimensions or positionings may be exaggerated to help visually convey certain principles. In the drawings, similar reference numerals among different figures designate like or corresponding, but not necessarily identical, elements.

DETAILED DESCRIPTION OF EXAMPLE EMBODIMENTS

In some embodiments of the disclosure, a lightguide can have a panel or slab shape. Light can be introduced into the lightguide from an edge of the lightguide, so that the major faces of the lightguide can guide and extract the light. The lightguide can incorporate features that manipulate the geometry or pattern of light flow within the lightguide. By manipulating the flow of light within the lightguide, the features can further control the pattern of light emitted from the lightguide, such as through a face of the lightguide. For example, the features can comprise reflectors that direct the flow of light in a specified direction to produce an illumination pattern having a desired shape.

In some embodiments of the disclosure, a lighting system can comprise a panel of optical material forming a lightguide and comprising an edge, the edge comprising a plurality of teeth and a light emitting diode disposed adjacent at least one of the teeth. In some embodiments, the teeth can comprise totally internally reflective surfaces oriented to redirect light emitted from the light emitting diode. In some embodiments, the teeth can comprise refractive surfaces oriented to redirect light emitted from the light emitting diode. In some embodiments, the teeth can comprise refractive surfaces and internally reflective surfaces that cooperate to redirect light emitted from the light emitting diode. In some embodiments, the teeth can comprise refractive surfaces and internally reflective surfaces that are arranged to collimate or focus light emitted from the light emitting diode. In some embodiments, the teeth can be operative to collimate light emitted by the light emitting diode. In some embodiments, the teeth can be operative to focus light emitted by the light emitting diode. In some embodiments, the light emitting diode can have an optical axis, and one of the teeth can deflect light from the optical axis light emitted by the light emitting diode.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Lighting systems will now be described more fully with reference to FIGS. 1-18, which describe representative embodiments of the present disclosure. FIG. 1 illustrates a representative lighting system. FIGS. 2-16 illustrate representative features that the lighting system may incorporate. FIGS. 17 and 18 illustrate representative illumination patterns for the lighting system.

Turning now to FIG. 1, this figure is an illustration of an overhead view of an example lighting system 100 in an example streetlight application in accordance with some embodiments of the disclosure. The lighting system 100 can comprise an outdoor luminaire or streetlight, for example, that illuminates a street side area 115 and a house side area 120, with more light going to the street side area 115.

In the illustrated embodiment, the lighting system 100 comprises a lightguide 105 that has an octagonal shape in the overhead view. Other embodiments of the lightguide 105 can have various shapes, for example round, circular, oval, or oblong or triangular, square, rectangular, hexagonal, or various other appropriate polygon forms. The lightguide 105 can comprise a slab, plate, or panel formed of acrylic or another appropriate optical material, for example. Cutting or molding a plate, slab, or panel of optical material into an octagonal shape can yield the lightguide 105, for example.

In the example octagonal form illustrated in FIG. 1, the lightguide 105 comprises eight straight edges 131, 132, 133, 134, 135, 136, 137, and 138. A light emitting diode circuit board 150 is positioned along each of the edges 133, 134, 135, and 136 that are on the house side 120 of the lighting system 100.

Each light emitting diode circuit board 150 couples light into the lightguide 105 through one of the edges 133, 134, 136, and the major faces of the lightguide 105 guide the coupled light. As will be discussed below with reference to FIGS. 2 and 3, one or both of the faces is typically patterned with microlenses 250 (see FIG. 2) that help release the guided light from the lightguide 105 in a controlled fashion. In an example embodiment, the features may be located within an area 110 of the lightguide 105 having a circular perimeter 141. The area 110 of the face within the illustrated circular perimeter 141 can thus be characterized as an extraction surface or region.

As illustrated, the light emitting diode circuit boards 150 are oriented relative to a reference line 145 that is perpendicular to the division 116 between the house side 120 and the street side 115. When the lighting system 100 is installed, the reference line 145 can be oriented perpendicular to a street. Meanwhile, the division 116 can extend along the direction of the street, for example, along an edge of the street or a curb.

The light emitting diode circuit board 150 that extends along the edge 133 is positioned to emit light along an axis 140 that is oriented at 67.5 degrees relative to the reference line 145. The light emitting diode circuit board 150 that extends along the edge 134 is positioned to emit light along an axis 140 that is oriented at 22.5 degrees relative to the reference line 145. The light emitting diode circuit board 150 that extends along the edge 135 is positioned to emit light along an axis 140 that is oriented at −22.5 degrees relative to the reference line 145. The light emitting diode circuit board 150 that extends along the edge is positioned to emit light along an axis 140 that is oriented at −67.5 degrees relative to the reference line 145.

As will be discussed in further detail below, the lightguide 105 comprises an array of light directing features 125 extending along the edge 134 and the edge 135. The light directing features 125 can redirect the light that is coupled into the edges 134 and 135 so that light emits from the lightguide 105 to provide an illumination pattern formed to provide a desirable form of street side illumination.

Turning now to FIG. 2, this figure provides illustrations of cross sectional views of an example section of the lighting system 100 where a light emitting diode 225 couples light into an edge 206 of the lightguide 105 in accordance with some embodiments of the disclosure. FIG. 2A illustrates without rays, while FIG. 2B illustrates representative light rays propagating via total internal reflection between the opposing lightguide faces. The cross sections of FIGS. 2A and 2B are taken perpendicular to the overhead view of FIG. 1, that is, cutting from one major lightguide face to the other major lightguide face.

In the embodiment of FIG. 2, the lightguide 105 does not include light directing features associated with the edge 206. In various embodiments, the lighting system 100 can have some edges that that receive light but do not have associated light directing features and other light-receiving edges do have light directing features. For example, the edge 206 illustrated in FIG. 2 can be at the side 133 or the side 136 of the lightguide 105 illustrated in FIG. 1 and discussed above.

As illustrated in FIG. 2B, the area 110 of the lightguide 105 that is patterned with microlenses 250 releases light in a controlled manner to facilitate desirable illumination.

Turning now to FIG. 3, this figure is an illustration of an example surface area 110 of the lightguide 105 of the lighting system 100, where the surface has been patterned with microlenses 250 to release a portion of internally incident light in accordance with some embodiments of the disclosure. In various embodiments, the microlenses 250 can comprise conical features, truncated cones, convex shapes, holes, concave structures, dimples, or other appropriate micro-optical features, for example. In some example embodiments, the lightguide 105 comprises one or more of the technologies disclosed in U.S. Pat. No. 8,459,858, the entire contents of which are hereby incorporated herein by reference. In some example embodiments, the lightguide 105 comprises one or more of the technologies disclosed in U.S. Pat. No. 7,357,553, the entire contents of which are hereby incorporated herein by reference.

As shown in FIG. 1 and discussed above, in some embodiments, the microlensed area 110 of the lightguide 105 may be centrally located so that the periphery of the face (adjacent the edges) is free from microlenses 250.

Figure 5:
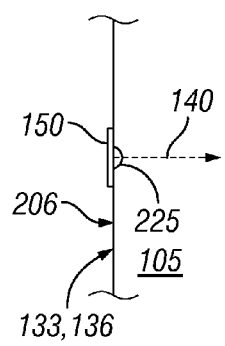
FIG. 5 illustrates a view of a single light emitting diode oriented to couple light into an edge of the lightguide of the lighting system according to some example embodiments of the present disclosure.
Figure 6:
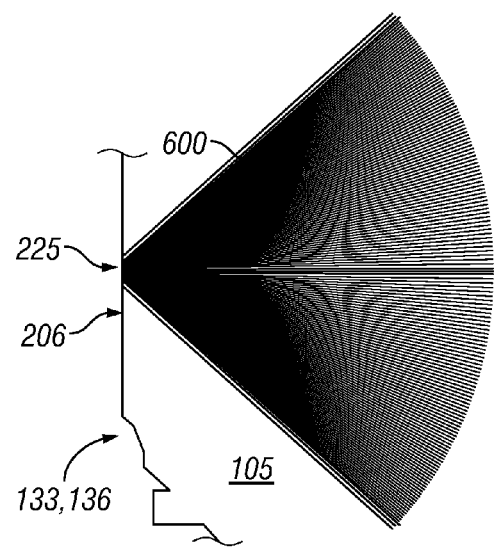
FIG. 6 illustrates a view of a representative pattern of light rays launched into lightguide of the lighting system by a single light emitting diode oriented as illustrated in FIG. 5 according to some example embodiments of the present disclosure.

Turning now to FIGS. 4, 5, and 6, these figures describe an example pattern of light 600 coupled into the lightguide 105 through the edge 206 without light directing features. FIGS. 4, 5, and 6 all provide overhead views. Thus, the views of FIGS. 4, 5, and 6 are perpendicular to the cross sectional views of FIG. 2.

FIG. 4 is an illustration of the single light emitting diode 225 coupling light into the example edge 206 of the lightguide 105 of the lighting system 100, wherein the coupled light is allowed to follow without redirection in accordance with some embodiments of the disclosure. FIG. 5 is an illustration of the single light emitting diode 225 oriented to couple light into the example edge 206 of the lightguide 105 of the lighting system 100 in accordance with some embodiments of the disclosure. FIG. 6 is an illustration of the example pattern 600 of light rays created by launching light into the example edge 206 of the lightguide 105 of the lighting system 100 using the single light emitting diode 225 oriented as illustrated in FIG. 5 in accordance with some embodiments of the disclosure.

As discussed above with reference to FIG. 2, the edge 206 can be at the side 136 or the side 133 of the lightguide 105, for example. As illustrated in FIG. 6, the pattern 600 of light spread within the lightguide 105 is symmetric with respect to the optical axis 140 of the light emitting diode 225. Thus, light flow within the lightguide 105 substantially follows the optical axis 140 of the light emitting diode 225.

Turning now to FIGS. 7, 8, and 9, these figures describe an example pattern of light 900, 901 resulting from coupling into the lightguide 105 through an edge 706 that has associated light directing features 125. The edge 706 can be associated with the side 134 or 135 of the lightguide 105 as illustrated in FIG. 1, for example.

FIGS. 4, 5, and 6 all provide overhead views. Thus, the views of FIGS. 7, 8, and 9 are perpendicular to the cross sectional views of FIG. 2 and consistent with the views of FIGS. 4, 5, and 6.

FIG. 7 is an illustration of a single light emitting diode 225 coupling light into the example edge 706 of the lightguide 105 of the lighting system 100 that has an associated example light directing feature 125, wherein the feature 125 redirects the optical axis 140 of the light emitting diode 225 in accordance with some embodiments of the disclosure. FIG. 8 is an illustration the single light emitting diode 225 oriented to couple light into the example edge 706 of the lightguide 105 of the lighting system 100 that has the example associated light directing feature 125 in accordance with some embodiments of the disclosure. FIG. 9 is an illustration of an example pattern 900, 901 of light rays launched into the example edge 706 of the lightguide 105 of the lighting system 100 by the single light emitting diode 225 oriented as illustrated in FIG. 8, wherein the edge 706 has the example associated light directing feature 125 in accordance with some embodiments of the disclosure.

In some embodiments, the light directing feature 125 can comprise a cut, void, or inclusion in the lightguide 105 that may create a totally internally reflective surface, for example. In various embodiments, the light directing features 125 may be formed by laser cutting, molding, machining, or other appropriate fabrication processes.

In the embodiment of FIG. 7, the light directing feature 125 comprises a reflective surface 701 that is positioned to intercept essentially all the light from the light emitting diode 225. FIG. 7 illustrates an example function, where the angle of incidence equals the angle of reflection, and the incident light is redirected by 45 degrees.

In the embodiment of FIG. 8, the reflective surface 701 is oriented so that a portion of the light emitted by the light emitting diode 225 is incident upon the reflective surface 701, while another portion bypasses the reflective surface 701. FIG. 9 illustrates an example pattern 900, 901 of light formed by the light directing feature 125 of FIG. 8. As illustrated by the ray diagram of FIG. 9, the resulting pattern 900, 901 of light spread within the lightguide 105 has been redirected and is asymmetric with respect to the original axis 140 of the light emitting diode 225. Additionally, FIG. 9 illustrates a light pattern portion 900 and a light pattern portion 901 that are divided as a result of part of the coupled light being redirected by the reflective surface 701, while another part misses the reflective surface 701.

Figure 10:
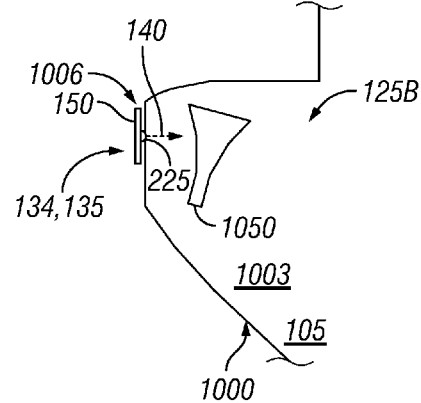
FIG. 10 illustrates a detail view of a light directing feature associated with an edge of the lightguide of the lighting system according to some example embodiments of the present disclosure.
Figure 11:
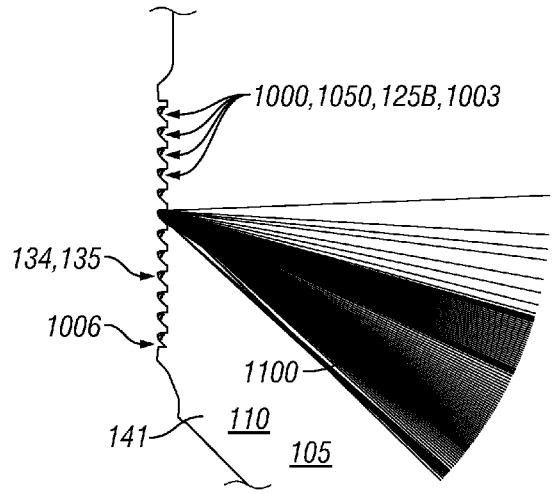
FIG. 11 illustrates a view an edge of the lightguide of the lighting system, where the edge has an associated array of the light directing features illustrated in FIG. 10 according to some example embodiments of the present disclosure.

Turning now to FIGS. 10 and 11, these figures describe an example pattern of light 1100 resulting from coupling into the lightguide 105 through an edge 1006 that has associated light directing features 125B. FIGS. 10 and 11 provide overhead views that have a consistent perspective with the views of FIGS. 4, 5, and 6 and the views of FIGS. 7, 8, and 9.

FIG. 10 is a detail illustration of an example light directing feature 125B associated with the example edge 1006 of the lightguide 105 of the lighting system 100 in accordance with some embodiments of the disclosure. FIG. 11 is an illustration of the example edge 1006 of the lightguide 105 of the lighting system 100, where the edge 1006 has an associated example array of the light directing features 125B illustrated in FIG. 10 in accordance with some embodiments of the disclosure.

In an example embodiment, the edge 1006 is located at the side 134 or the side 135 of the lightguide 105 to redirect light and provide an illumination pattern that may be preferentially biased street side, as discussed above.

In the illustrated embodiment, each light directing feature 125B comprises a protrusion or tooth 1003 that faces the light emitting diode 225. Thus, each tooth 1003 has an associated light emitting diode 225. The sides 1000 of each tooth 1003 form totally internally reflecting surfaces for directing light via internal reflection. An opening 1050 in each tooth 1003 has surfaces that refract incident light emitted by the light emitting diode 225. The opening 1050 can be formed by laser ablation from above a major surface of the lightguide 105, for example. The opening 1050 can be viewed as an inclusion, for example. The opening 1050 can extend between the two major sides of the lightguide 105 in some example embodiments. The internally reflecting sides 1000 of the tooth can be formed by laser, by mechanical processing with a sharp tool bit, or by molding, for example.

Using the internally reflecting sides 1000 and the opening 1050, each tooth manages light via a combination of reflection and refraction to produce a redirected light pattern 1100 illustrated in FIG. 11 in example form. The illustrated light directing feature 125B comprises both refractive and reflective surface contours that provide collimation and focusing. Accordingly, the light directing features direct light off of the optical axis 140 of the light emitting diode 225. As compared to the embodiment of FIG. 9, the embodiment of FIGS. 10 and 11 produces an asymmetric light pattern having 1100 reduced beam spread.

Figure 12:
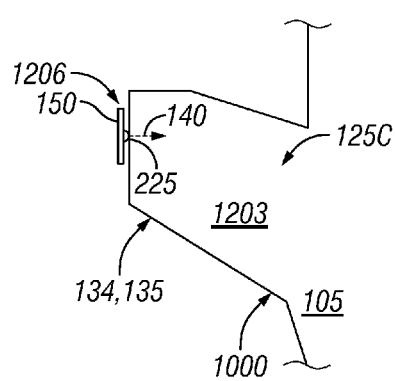
FIG. 12 illustrates a detail view of a light directing feature associated with an edge of the lightguide of the lighting system according to some example embodiments of the present disclosure.
Figure 13:
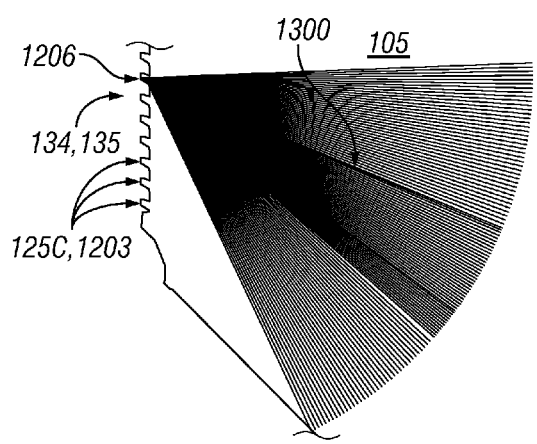
FIG. 13 illustrates a view an edge of the lightguide of the lighting system, where the edge has an associated array of the light directing features illustrated in FIG. 12 according to some example embodiments of the present disclosure.

Turning now to FIGS. 12 and 13, another example embodiment of a light directing feature 125C is illustrated, along with a resulting light pattern 1300. FIG. 12 is a detail illustration of the example light directing feature 125C associated with an example edge 1206 of the lightguide 105 of the lighting system 100 in accordance with some embodiments of the disclosure. FIG. 13 is an illustration of the example edge 1206 of the lightguide 105 of the lighting system 100, where the edge 1206 has an associated example array of the light directing features 125C illustrated in FIG. 12 according in accordance with some embodiments of the disclosure.

The edge 1206 and associated light directing features 125C can be located at the side 134 and the side 135 of the lightguide 105 as illustrated in FIG. 1, for example. As discussed above, the edge 1206 and light directing features 125C can direct light within the lightguide 105 to provide an external illumination pattern having a desirable geometry.

The illustrated light directing features 125C can be viewed as teeth formed in the lightguide edge 1206. The light emitting diode 225 couples light into the light directing feature 1203 adjacent a relatively flat surface. Light that is coupled in is reflected via total internal reflection by one or more sides 1000, and thus is redirected from the original direction of propagation. The resulting pattern 1300 is skewed or biased to one side of the optical axis 140 of the light emitting diode 225.

Example placements and geometries for light directing features formed at a lightguide edge will now be further discussed with reference to FIGS. 14, 15, and 16. These figures further illustrate a portion of the circular area 110 that is patterned with microlens light extraction features as discussed above. In some embodiments, each light emitting diode has one corresponding light directing feature. In some embodiments, a single light directing feature may redirect light emitted by two or more light emitting diodes.

Figure 14:
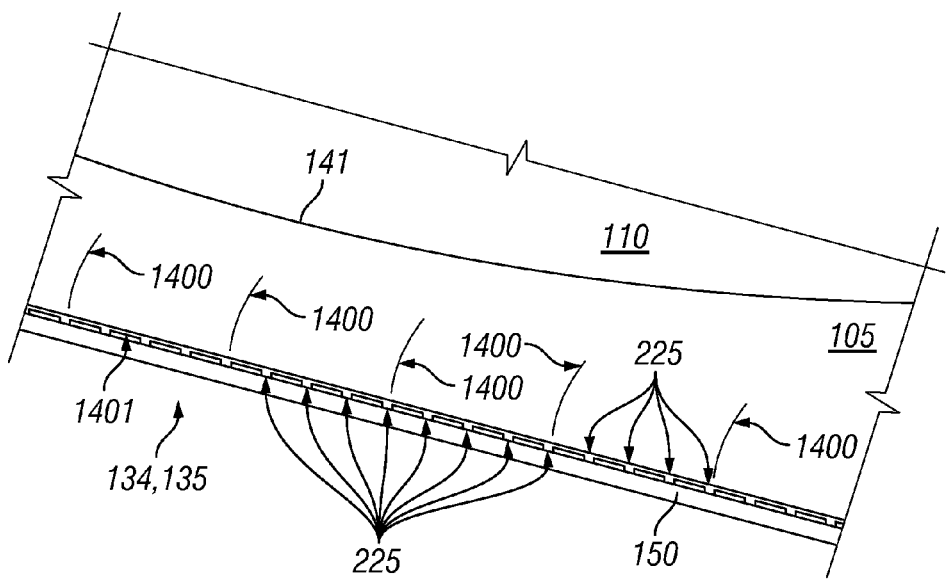
FIG. 14 illustrates a representative placement and geometry of light emitting diodes and light directing features formed at an edge of the lightguide of the lighting system according to some example embodiments of the present disclosure.

Turning now to FIG. 14, this figure is an illustration of an example placement and geometry of light emitting diodes 225 and example light directing features 1400 formed at an example edge 1401 of the lightguide 105 of the lighting system 100 in accordance with some embodiments of the disclosure.

The edge 1401 can be located at the side 134 or the side 135 of the lightguide 105 as illustrated in FIG. 1 and discussed above, for example. In some example embodiments, the light directing features 1400 can comprise cuts or grooves in the lightguide 105. The light directing features 1400 can be curved or arched or may otherwise deviate from a linear form, for example. In some curved embodiments, the light directing features 1400 may collimate or focus incident light, for example. In some curved embodiments, the light directing features 1400 may increase divergence of incident light.

In the embodiment of FIG. 14, there are more light emitting diodes 225 than light directing features 1400. As illustrated, there are four light emitting diodes 225 for every light directing feature 1400. Three light emitting diodes 225 are located between each directing features 1400. In some embodiments, each light directing feature 1400 directs light from multiple light emitting diodes 225.

Figure 15:
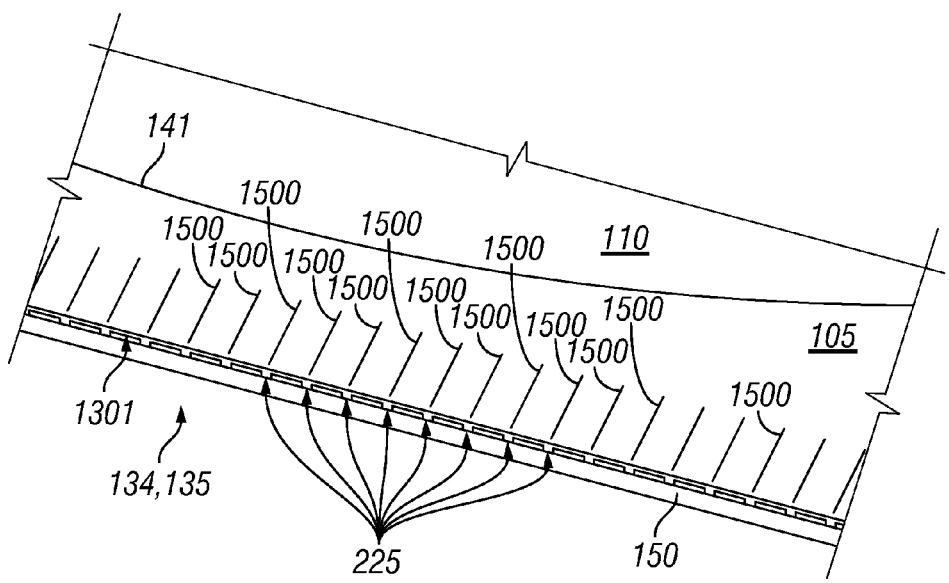
FIG. 15 illustrates another representative placement and geometry of light emitting diodes and light directing features formed at an edge of the lightguide of the lighting system according to some example embodiments of the present disclosure.

Turning now to FIG. 15, this figure is an illustration of an example placement and geometry of light emitting diodes 225 and example light directing features 1500 formed at an example edge 1501 of the lightguide 105 of the lighting system 100 in accordance with some embodiments of the disclosure. In the embodiment of FIG. 15, the light directing features 1500 are substantially linear and may comprise cuts or grooves formed in the lightguide 105. As an alternative to substantially linear, the light directing features 1500 can comprise various other appropriate forms, including curved cuts in some other embodiments, for example. In various embodiments, the light directing features 1500 may be formed utilizing laser cutting or ablation or diamond machining, for example. In various embodiments, the light directing features 1500 manipulate light by refraction, by internal reflection, or a combination of refraction and internal reflection.

As illustrated, each light emitting diode 225 is substantially aligned to a corresponding light directing feature 1500. Accordingly, an array of the light directing features 1500 can be aligned to an array of the light directing features. In this manner, each light directing feature 1500 can process light from an associated light emitting diode 225.

Figure 16:
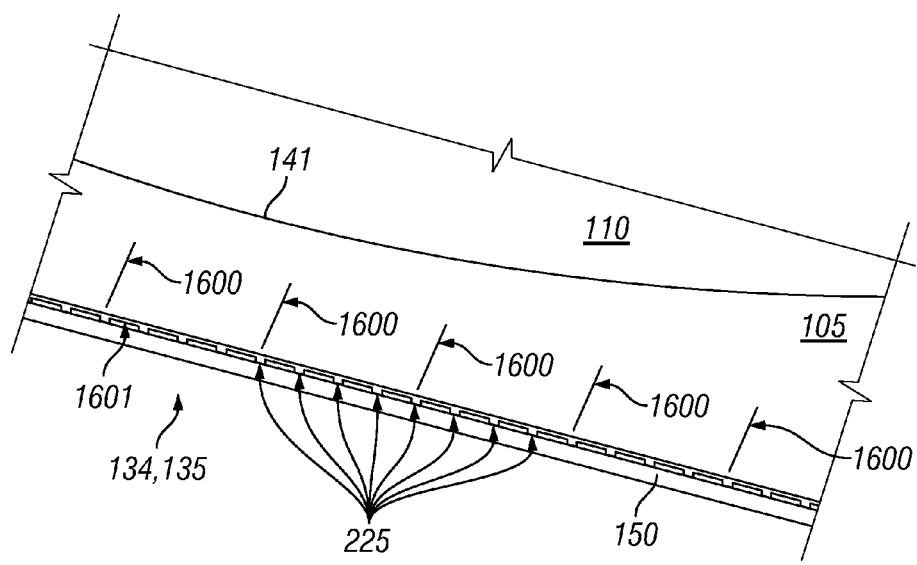
FIG. 16 illustrates another representative placement and geometry of light emitting diodes and light directing features formed at an edge of the lightguide of the lighting system according to some example embodiments of the present disclosure.

Turning now to FIG. 16, this figure is an illustration of an example placement and geometry of light emitting diodes 225 and example light directing features 1600 formed at an example edge 1601 of the lightguide 105 of the lighting system 100 in accordance with some embodiments of the disclosure.

Like the embodiment of FIG. 15, each of the light directing features 1600 illustrated in FIG. 16 is substantially linear. The light directing features 1600 may be formed by material removal using cutting, grinding, ablation, or other appropriate process, for example. In various embodiments, the light directing features 1600 manipulate light by refraction, by internal reflection, or a combination of refraction and internal reflection.

In the embodiment of FIG. 16, there are more light emitting diodes 225 than light directing features 1600. As illustrated, there are four light emitting diodes 225 for every light directing feature 1400. Three light emitting diodes 225 are located between each directing features 1600, and one light emitting diode 225 is substantially centered on each light directing feature. In some embodiments, each light directing feature 1600 directs light from multiple light emitting diodes 225.

Some example illumination patterns will now be discussed with example reference to FIGS. 17 and 18.

Turning now to FIG. 17, this figure is an illustration of example computer-generated polar plots 1700 of intensity distributions 1750, 1775 for the lighting system 100 in two configurations in accordance with some embodiments of the disclosure. More specifically, FIG. 17 two intensity distributions 1750, 1775 overlaid upon one another for comparison.

In the intensity distribution 1750, the lighting system 100 is configured as illustrated in FIG. 1 and discussed above, but without any of the light directing features 125. In this configuration, the intensity distribution 1750 is symmetric with respect to the reference line 145, which is illustrated in FIG. 1 and discussed above.

In the intensity distribution 1775, the lighting system 100 is configured as illustrated in FIG. 1 and discussed above, including the light directing features 125. As a result of the addition of the light directing features 125, the intensity distribution 1775 is redirected off of the reference line 145 and is rotated relative to the intensity distribution 1750.

Turning now to FIG. 18, this figure is an illustration of example computer-generated polar plots 1800 of intensity distributions 1850, 1875 for the lighting system 100 in two configurations in accordance with some embodiments of the disclosure. The plots 1800 effectively provide a bird's eye view of light intensity as a function of angle as delivered by the lighting system 100 at a surface, with street side 115 on the right side of the plots 1800 and house side 120 on the left side of the plots 1800.

For the solid-line plot 1850, the lighting system 100 does not incorporate the light directing features 125 but is otherwise configured as illustrated in FIG. 1 and discussed above. The street side bias of the intensity distribution 1850 results from the light emitting diodes 225 being mounted on the house side 120 of the lightguide 105, and thus pointed street side.

For the dashed-line plot 1875, the lighting system 100 incorporates the light directing features 125 as illustrated in FIG. 1 and discussed above. Thus, the street side bias of the intensity distribution 1875 results not only from the light emitting diodes 225 being mounted on the house side 120 of the lighting system 100 (and thus pointed in a street-side direction), but also from the light directing features 125. As compared to the solid-line plot 1850, the light directing features 125 have narrowed and lengthened the distribution 1875. Light that would otherwise be sent across the street is better concentrated on the street and better sent up and down the street. In other words, the street is better illuminated lengthwise and widthwise.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A lighting system comprising:
 a light emitting diode oriented to emit light in a direction; and
 a lightguide comprising:
  a first face;
  a second face;
  an edge that extends between the first face and the second face and that is disposed adjacent the light emitting diode to receive the emitted light; and
  a reflective surface that is disposed between the first face and the second face, adjacent the edge and at an acute angle relative to the edge, and wherein the reflective surface is oriented to divert the emitted light from the direction.

2. The lighting system of claim 1, wherein an array of light emitting diodes is disposed adjacent the edge of the lightguide, and
 wherein the lightguide comprises a corresponding array of reflective surfaces that are disposed between the first face and the second face.

3. The lighting system of claim 1, wherein the lightguide comprises an optical material disposed between the first face and the second face,
 wherein the lightguide comprises a tooth disposed at the edge, and
 wherein the tooth comprises the reflective surface.

4. The lighting system of claim 1, wherein at least one of the first face and the second face is patterned to release light from the lightguide.

5. The lighting system of claim 1, wherein the reflective surface comprises a cut in the edge of the lightguide.

6. The lighting system of claim 1, wherein the reflective surface comprises a totally internally reflective surface that extends into the lightguide.

7. The lighting system of claim 1, wherein the reflective surface comprises a totally internally reflective surface that extends from the first face to the second face.

8. A lightguide comprising:
 a first internally reflective face formed on a body of optical material;
 a second internally reflective face formed on the body of optical material, opposite the first internally reflective face;
 an edge extending on the body of optical material between the first internally reflective face and the second internally reflective face; and
 a plurality of reflectors that are formed in the body of optical material along the edge, each reflector configured to redirect light that is coupled into the body of optical material through the edge.

9. The lightguide of claim 8, wherein the first internally reflective face comprises an octagonal shape.

10. The lightguide of claim 8, wherein each reflector comprises a totally internally reflective surface, and
 wherein the lightguide comprises an edgelit panel.

11. The lightguide of claim 8, wherein each reflector is disposed at an acute angle relative to the edge.

12. The lightguide of claim 8, wherein each reflector comprises a curved internally reflective surface.

13. The lightguide of claim 8, wherein the optical material comprises substantially clear plastic;
 wherein the first internally reflective face comprises a polygon; and
 wherein each reflector in the plurality of reflectors comprises one or more totally internally reflective surfaces formed in the optical material.

14. The lightguide of claim 8, wherein the first internally reflective face is substantially planar.

15. A lighting system comprising:
 a light source that is operative to emit light along an axis;
 a panel of optical material that forms a lightguide and that comprises:
  a first face;
  a second face opposite the first face; and
  an edge that extends between the first face and the second face and that is disposed adjacent the light source to receive the emitted light, the edge comprising an array of teeth, wherein a tooth of the array of teeth comprises a reflective surface; and wherein the reflective surface intersects the axis.

16. The lighting system of claim 15, wherein the reflective surface comprises a cut in the optical material, and wherein the reflective surface is disposed at an acute angle relative to the edge.

17. The lighting system of claim 15, wherein the first face and the second face are substantially octagonal.

18. A lighting system comprising:

a light source that is operative to emit light along an axis;

a panel of optical material that forms a lightguide and that comprises:

a first face;

a second face opposite the first face;

an edge that extends between the first face and the second face and that is disposed adjacent the light source to receive the emitted; and a reflective surface intersecting the axis, wherein the light source comprises at least one light emitting diode, wherein the panel of optical material comprises a second edge that extends between the first face and the second face, the second edge opposite the edge;

wherein the axis extends between the edge and the second edge of the panel of optical material, wherein the reflective surface comprises a totally internally reflective surface that is formed in the optical material, wherein the totally internally reflective surface is operative to deflect at least a portion of the light emitted along the axis so that the deflected light travels along a second axis, and wherein the axis and the second axis form an acute angle.

\* \* \* \* \*